United States Patent [19]

Cookson

[11] 4,064,354

[45] Dec. 20, 1977

[54] GAS INSULATED TRANSMISSION LINE

[75] Inventor: Alan H. Cookson, Southboro, Mass.

[73] Assignee: Westinghouse Electric Corporation, Pittsburgh, Pa.

[21] Appl. No.: 740,443

[22] Filed: Nov. 10, 1976

[51] Int. Cl.² .............................................. H01B 9/04
[52] U.S. Cl. .................................. 174/28; 174/14 R; 174/16 B
[58] Field of Search ................. 174/28, 29, 16 B, 111, 174/99 B, 14 R, 88 B, 21 C

[56] References Cited

U.S. PATENT DOCUMENTS

| 3,515,909 | 6/1970 | Trump | 174/28 X |
| 3,767,837 | 10/1973 | Graybill | 174/27 |
| 3,792,188 | 2/1974 | Cronin | 174/14 R X |
| 3,814,879 | 6/1974 | Cookson et al. | 174/14 R X |
| 3,895,176 | 7/1975 | Cookson et al. | 174/28 |
| 3,898,367 | 8/1975 | Nakata | 174/14 R |
| 4,029,890 | 6/1977 | Nakata | 174/14 R |
| 4,029,891 | 6/1977 | Nakata | 174/14 R |
| 4,029,892 | 6/1977 | Nakata | 174/14 R |

FOREIGN PATENT DOCUMENTS 2,422,961  10/1975  Germany ........................ 174/14 R Primary Examiner—Arthur T. Grimley
Attorney, Agent, or Firm—M. S. Yatsko

[57] ABSTRACT

A gas insulated transmission line having an inner conductor disposed within a cylindrical outer sheath. A spacer assembly for supporting the transmission line comprises two members which fit over the inner conductor and which together surround the inner conductor. The two members are secured together by a curved plate, and the entire assembly can be disposed within the outer sheath to support the inner conductor within the outer sheath. The material of which the two members are made is preferably a material having a relative permittivity less than approximately 3.7. The two members together in cross section can be disc-shaped or conically-shaped.

14 Claims, 4 Drawing Figures

GAS INSULATED TRANSMISSION LINE

BACKGROUND OF THE INVENTION

This invention relates generally to gas insulated equipment, and more particularly to a gas insulated transmission line.

A typical gas insulated transmission line comprises a cylindrical, elongated outer sheath, a cylindrical, elongated inner conductor disposed within the outer sheath, and an insulating gas to electrically insulate the high potential inner conductor from the low potential, or grounded, outer sheath. Spaced along the inner conductor are insulators for supporting the inner conductor concentrically within the outer sheath. These insulators are typically spaced at 20 foot intervals, and are generally of a silica-filled epoxy because of its desirable electrical and mechanical properties. The spacers usually are cast either directly onto the conductor, or onto a conductor sleeve which is then welded to the inner conductor. A drawback to the use of such silica-filled epoxy spacers, however, is that they are quite expensive. The material costs for the spacer assembly for a 230 kilovolt sulfur hexafluoride insulated transmission line may approach 16% of the total material cost of the line. It can thus be seen that it is desirable to reduce the cost of the spacer assembly, particularly if new designs of such gas insulated transmission lines mandate an increased number of spacers.

SUMMARY OF THE INVENTION

The invention disclosed herein provides a gas insulated transmission line including an outer sheath, an inner conductor, and a spacer assembly for supporting the inner conductor within the outer sheath. The spacer assembly comprises first and second members which, when joined together, form an inner bore in which the cylindrical inner conductor is disposed, and an outer circumference which is disposed adjacent to the outer sheath. A curved plate is positioned adjacent one of the members, and extends circumferentially beyond that member to openings disposed within the other member adjacent the outer sheath. The curve plate has nubs which fit into the openings, thereby holding the plate secure against the member and securing the two members together.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
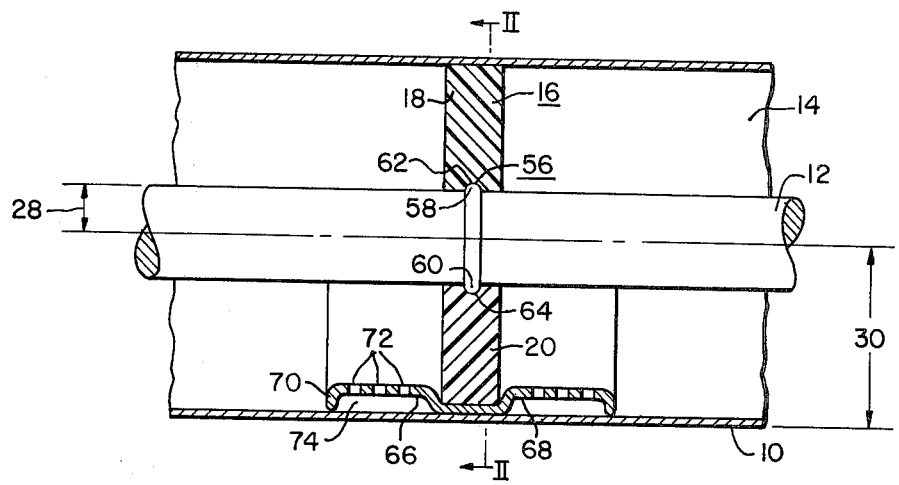
FIG. 1 is a sectional view of a compressed gas insulated transmission line utilizing the teachings of this invention.
Figure 2:
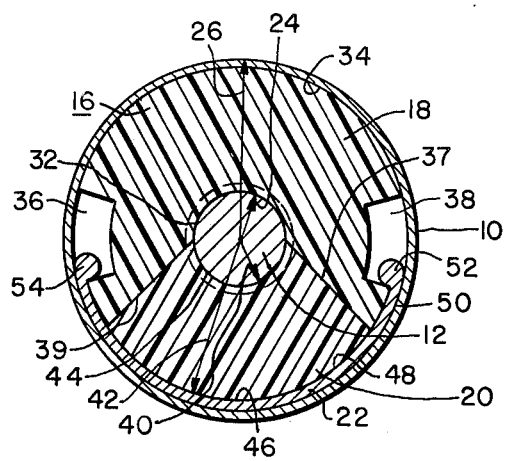
FIG. 2 is a sectional view taken along line II—II of FIG. 1.

Referring now more particularly to FIG. 1, therein is shown a gas insulated transmission line utilizing the teachings of this invention. The transmission line includes an elongated, cylindrical outer sheath 10, an elongated, cylindrical inner conductor 12 disposed within the outer sheath 10, and an insulating gas 14, such as sulfur hexafluoride, for electrically insulating the inner conductor 12 from the outer sheath 10. Both the outer sheath 10 and the inner conductor 12 are typically of a conducting material such as aluminum. Also included within the transmission line segment is a spacer assembly 16 for insulatably supporting the inner conductor 12 within the outer sheath 10. The description of the spacer assembly 16 may be best understood with reference to FIG. 2.

The spacer assembly 16 is comprised of three elements; a first member 18, a second member 20, and a curved plate 22. The first member 18 has a radial shape which may be best defined along its radial extremities by an inner radius 24 and an outer radius 26. The inner radius 24 is substantially the same as the outer radius 28 of the inner conductor 12, and the outer radius 26 is substantially the same as the inner radius 30 of the outer sheath 10. The first member 18 extends along its inner radial extremity 32 for an arc distance of 180°. The first member 18 has its inner radial extremity 32 positioned adjacent to the inner conductor 12, and its outer radial extremity 34 positioned adjacent to the outer sheath 10. The first member 18 also has a pair of cavities 36, 38 therein extending inwardly from the outer radial extremity 34.

The second member 20 likewise has a radial shape defined along its radial extremities by an inner radius 40 and an outer radius 42. The inner radius 40 is substantially the same as the outer radius 28 of the inner conductor 12, and the outer radius 42 is less than the inner radius 30 of the outer sheath 10. The second member 20 is disposed within the outer sheath 10 between the inner conductor 12 and the outer sheath 10, and mates with the first member 18. The inner radial extremity 44 of the second member 20 extends for an arc distance of 180°, and is positioned adjacent to the inner conductor 12. The first member 18 and the second member 20 together extend along their outer radial extremities 34, 46, respectively, for an arc distance of 360°. The angles 37, 39 at which the first member 18 and the second member 20 extend in going from the inner radial extremity 32, 44 to the outer radial extremity 34, 46 can be of any angle up to where the angle 37, 39 is tangent to the circumferential end points of the first and second members 18, 20.

Securing the first member 18 to the second member 20 is a curved plate 22. The curved plate 22 is defined along its radial extremities by an inner radial extremity 48 and an outer radial extremity 50. The inner radial extremity 48 has an inner radius associated therewith which is substantially the same as the outer radius 42 of the second member 20, and the outer radial extremity 50 by a radius substantially the same as the inner radius 30 of the outer sheath 10. The plate 22 is positioned intermediate the second member 20 and the outer sheath 10. The curved plate 22 has nubs 52, 54 at each circumferential end thereof, and the plate 22 extends circumferentially beyond the second member outer radial extremity 50 to the first member cavities 36, 38. The nubs 52, 54 are disposed within the first member cavities 36, 38, and hold the curved plate 22 in its location. By so maintaining the position of the curved plate 22, the curved plate 22 secures the second member 20 to the first member 18.

The first member 18 and the second member 20 are preferably of a material having a low relative permittivity. The materials should have a permittivity less than 3.7. Examples of materials which may be used for the first and second members 18 and 20, respectively, are polymethyl pentene, polypropylene, polyphenylene oxide, polybutadiene and UHMW polyethylene, polycarbonate, polybutadiene, and polysulfone. The curved plate 22 could be of a metal, an insulating plastic, or a conducting plastic, depending upon additional variations which will hereinafter be explained.

If it is so desired, means 56 may be incorporated for preventing longitudinal movement of the spacer assembly 16, amd more particularly, the first and second members 18, 20, respectively, with respect to the inner conductor 12. These means 56 may, for example, comprise metal ridges 58, 60 which are attached to the inner conductor 12, and which fit inside grooves 62, 64 in members 18, 20, respectively. The ridges 58, 60 will then prevent longitudinal movement of the spacer assembly 16. Although not illustrated, it is to be understood that these ridges may, for example, be on either side of the spacer assembly 16, which likewise would prevent longitudinal movement of the spacer assembly 16 with respect to the inner conductor 12. Also, if it is so desired, the inner conductor may be permitted to move within the spacer assembly, but means may be desired for preventing movement of the spacer assembly 16 with respect to the outer sheath. This can be accomplished by the use of similar ridges on the outer sheath 10 adjacent to the, or within grooves located in, the spacer assembly 16.

Figure 3:
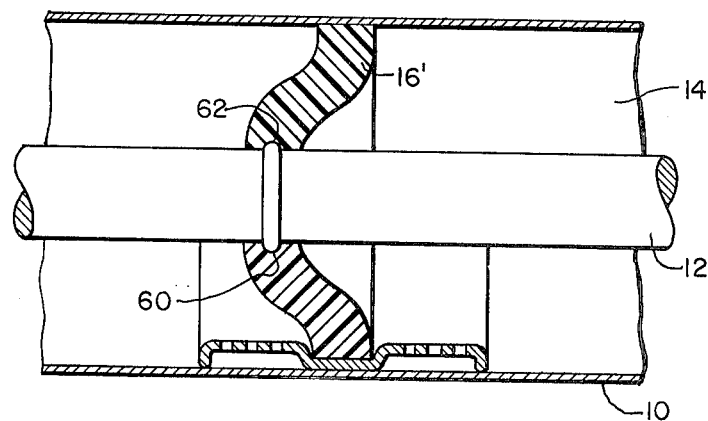
FIG. 3 illustrates a modification of the spacer assembly illustrated in FIG. 1.

FIG. 3 illustrates a modification of the spacer assembly of FIG. 1. In FIG. 1, the spacer assembly was, in radial cross section, generally disc-shaped. The split spacer assembly 16 of the present invention may likewise be conically shaped as illustrated in FIG. 3 as element 16'. The description of the spacer assembly 16 is likewise applicable to the conically shaped spacer assembly 16' of FIG. 3. If the sole purpose of the curved plate 22 is to secure the first member 18 and the second member 20 together, then the curved plate 22 may be of an insulating plastic. However, it may be desirable to utilize the curved plate 22 for an additional function; namely, the entrapping of conducting or semiconducting particles which may be present within the insulating gas 14, and which, if present along the spacer 16 surface, may initiate flashover and breakdown. In this case, illustrated in FIGS. 1 and 3, the curved plate 22 should be either of metal or a conducting plastic.

To accomplish this additional particle trapping function, the curved plate 22 has at least one, or two if desired, longitudinal extensions such as those illustrated in FIG. 1 as elements 66 and 68. The longitudinal extension 66 extends along a radius less than the inner radius 30 of the outer sheath 10, thereby being spaced apart from the outer sheath. The extension 66 may, however, at its end portion 70 contact the outer sheath 10 for support purposes. The longitudinal extension 66 has a plurality of openings 72 therein, and it is through these openings 72 that the conducting or semiconducting particles pass and become entrapped in the low field region 74 between the extension 66 and the outer sheath 10. The openings 72 may, for example, be circular holes or slots.

Figure 4:
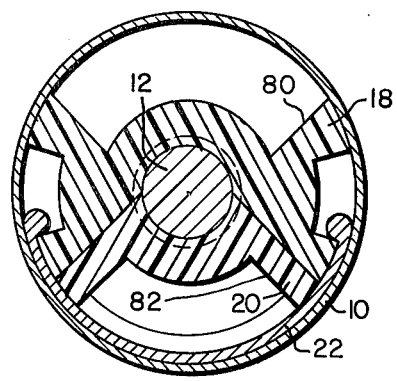
FIG. 4 illustrates a modification of the spacer assembly illustrated in FIG. 2.

FIG. 4 disclosed a further modification of the spacer assembly 16 illustrated in the preceding figures. In FIG. 4, openings 80, 82 are included within the first and second members 18, 20. These openings 80, 82 may be of any of numerous sizes or configurations, depending upon the designer's desires and the purposes to be served. The openings 80, 82 may be of a small size for the purpose of facilitating gas flow past the spacer assembly or, as illustrated, of a relatively large size to minimize the surface area upon which particles may adhere.

Thus, this invention provides a spacer assembly for use in gas insulated transmission lines which minimizes the cost of insulatably supporting the inner conductor within the outer sheath, and which additionally can function as a conductive particle trap.

I claim as my invention:

1. A gas insulated transmission line comprising:
an elongated, cylindrical inner conductor disposed within said outer sheath, said inner conductor having a radial outer radius;
an insulating gas disposed within said outer sheath, said insulating gas electrically insulating said inner conductor from said outer sheath; and
at least one spacer assembly disposed within said outer sheath, said spacer assembly insulatably supporting said inner conductor within said outer sheath, said spacer assembly comprising:
a first member having a radial shape defined along its radial extremities by an inner radius substantially the same as said inner conductor outer radius and by an outer radius being substantially the same as said outer sheath inner radius, said first member along its inner radial extremity extending for an arc distance of 180°, said first member being disposed intermediate said inner conductor and said outer sheath, said first member inner radial extremity being positioned adjacent said inner conductor, said first member having a pair of cavities therein extending inwardly from said outer radial extremity;
a second member having a radial shape defined along its radial extremities by an inner radius substantially the same as said inner conductor outer radius and by an outer radius less than said outer sheath inner radius, said second member being disposed intermediate said inner conductor and said outer sheath, said second member inner radial extremity extending for an arc distance of 180° and being positioned adjacent said inner conductor, said first and second member outer radial extremities together extending for an arc distance of 360°; and
a curved plate having inner and outer radial extremities defined by an inner radius substantially the same as said second member outer radius and by an outer radius substantially the same as said outer sheath inner radius, said plate being positioned intermediate said second member and said outer sheath, said plate having an inwardly projecting nub at each circumferential end thereof, said plate circumferentially extending beyond said second member outer radial extremity to said first member cavities such that said nubs are disposed within said first member cavities, said plate securing said first member to said second member.

2. The transmission line according to claim 1 wherein said first and second members are made of a material having a relative permittivity less than 3.7.

3. The transmission line according to claim 2 wherein said first and second member material is polymethyl pentene, polypropylene, polyphenylene oxide, polybutadiene and UHMW polyethylene, polycarbonate, polybutadiene or polysulfone.

4. The transmission line according to claim 1 including means for preventing longitudinal movement of said first and second members with respect to said inner conductor.

5. The transmission line according to claim 1 including means for preventing longitudinal movement of said first and second members with respect to said outer sheath.

6. The transmission line according to claim 1 wherein said first and second members together in cross section are disc-shaped.

7. The transmission line according to claim 1 wherein said first and second members together in cross section are conically shaped.

8. The transmission line according to claim 1 including an extension of said curved plate extending longitudinally beyond said spacer assembly, said extension being spaced apart from said outer sheath at a portion thereof, said extension having a plurality of openings therein.

9. The transmission line according to claim 1 wherein said curved plate is of an electrically conducting material.

10. The transmission line according to claim 1 wherein said curved plate is of an electrically insulating material.

11. The transmission line according to claim 1 wherein said first member has a longitudinal opening therethrough.

12. The transmission line according to claim 1 wherein said second member has a longitudinal opening therethrough.

13. The transmission line according to claim 1 wherein said insulating gas is sulfur hexafluoride.

14. The transmission line according to claim 1 wherein said outer sheath and said inner conductor are made of a material comprising aluminum.

* * * * *

UNITED STATES PATENT AND TRADEMARK OFFICE
CERTIFICATE OF CORRECTION

PATENT NO. : 4,064,354
DATED : December 20, 1977
INVENTOR(S) : Alan H. Cookson

It is certified that error appears in the above-identified patent and that said Letters Patent are hereby corrected as shown below:

In column 4, between lines 10 and 11, insert the following -- an elongated cylindrical outer sheath having a radial inner radius; --.

Signed and Sealed this

Thirteenth Day of February 1979

[SEAL]

Attest:

RUTH C. MASON
Attesting Officer

DONALD W. BANNER
Commissioner of Patents and Trademarks